J. C. HILLS.
Churn Body.
No. 2,349. Reissued Sept. 4, 1866.
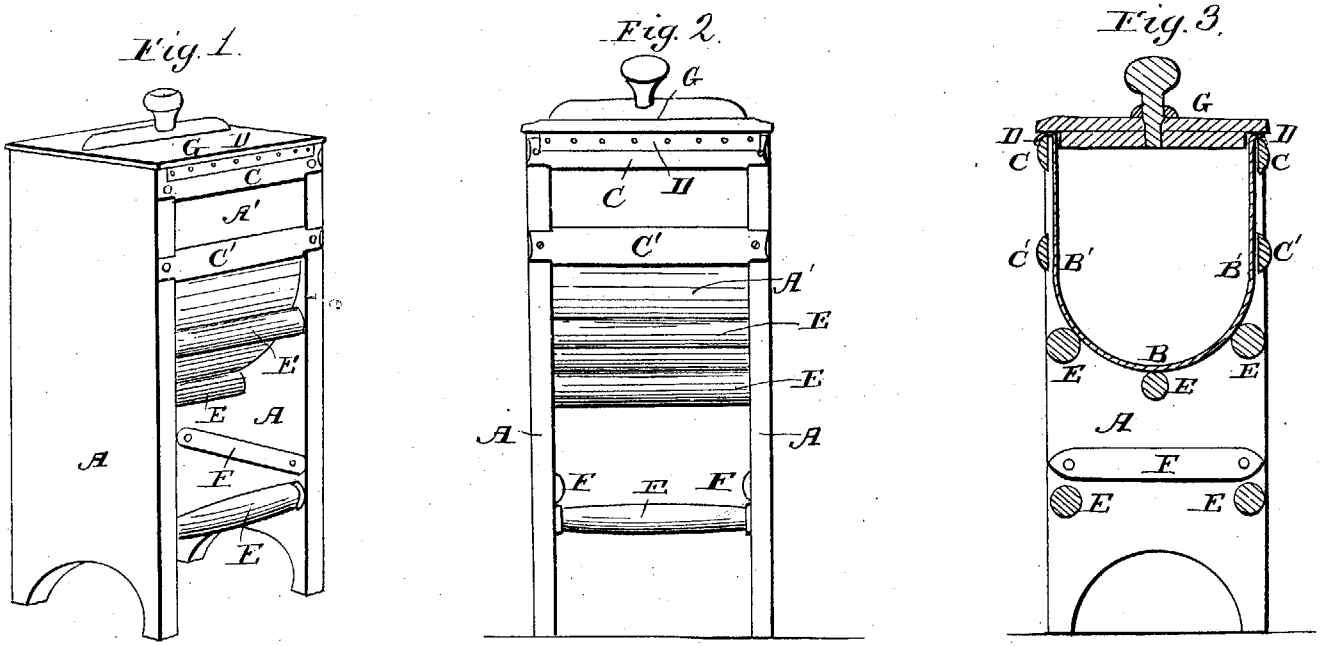
N. PETERS. Photo-Lithographer, Washington, D. C.

UNITED STATES PATENT OFFICE.

J. C. HILLS, OF WILLOUGHBY, OHIO.

IMPROVEMENT IN THE CONSTRUCTION OF CHURN-BODIES.

Specification forming part of Letters Patent, No. 42,851, dated May 24, 1864; Reissue No. 2,349, dated September 4, 1866.

*To all whom it may concern:*

Be it known that I, J. C. HILLS, of Willoughby, in the county of Lake and State of Ohio, have invented new and useful Improvements in Churns; and I do hereby declare that the following is a full and complete description of the construction of the same, reference being had to the accompanying drawings, making a part of the specification, in which—

Figure 1 is a perspective view. Fig. 2 is an end view. Fig. 3 is a vertical section.

Like letters refer to like parts in the several views.

The nature of my invention relates to the construction of the churn-body, the sides of which are composed each of a board, A, which is cut away in the middle portion of the lower end to form legs, as shown in Figs. 1 and 2. A semicircular groove, B, Fig. 3, is cut upon the inner face of each piece A from B to B′. This groove is about one-quarter of an inch deep, and in width sufficient to admit of a plate or sheet of suitable material to form the sides and ends A′ of one piece, and in length exceeding the length of the groove about two inches. The piece for the sides and end A′ is then so bent or formed as to be pressed into the groove when luted.

A half-round bar, C, is screwed to the top of the sides A, as shown in the figure, and the ends of the sheet A′ are turned or lapped over the bar C, as shown at D, and then fastened. Additional bars C′ are screwed to the side boards, A, at a point about half-way from the top of the body to the lower curve of the sheet A′.

The bars E are introduced to give additional strenth to the structure. A cleat, F, is also screwed to the inner surface of each side to protect it from warping. The whole body may be finished by painting inside and out, or by varnishing. A suitable cover, G, completes the structure.

What I claim as my improvement, and desire to secure by Letters Patent, is—

The herein-described construction of a churn-body, consisting of the sides A A, the sheet A′, groove B B′, bars C, C′, and E, when constructed and arranged in the manner and for the purpose specified.

Witnesses:
S. D. JONES,
E. M. JONES.

J. C. HILLS.